(12) United States Patent
Banister

(10) Patent No.: US 6,456,647 B1
(45) Date of Patent: Sep. 24, 2002

(54) TWO STEP SIGNAL RECOVERY SCHEME FOR A RECEIVER

(75) Inventor: Brian C. Banister, San Diego, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/212,853

(22) Filed: Dec. 16, 1998

(51) Int. Cl.[7] .......................... H04B 15/00; H04K 1/00; H04L 27/30
(52) U.S. Cl. ...................... 375/142; 375/150; 375/343
(58) Field of Search .................. 370/335, 342; 375/142, 144, 148, 150, 343, 349, 347, 136, 147, 316

(56) References Cited

U.S. PATENT DOCUMENTS

| | | | |
|---|---|---|---|
| 5,414,699 A | * | 5/1995 | Lee .............................. 370/18 |
| 5,724,378 A | * | 3/1998 | Miki et al. ................... 375/200 |
| 5,809,020 A | * | 9/1998 | Bruckert et al. ............. 370/355 |
| 6,069,912 A | * | 5/2000 | Sawahashi et al. ......... 375/142 |
| 6,304,750 B1 | * | 10/2001 | Rashid-Farrokhi et al. . 455/137 |

* cited by examiner

Primary Examiner—Mohammad H. Ghayour
(74) Attorney, Agent, or Firm—Christopher P. Maiorana, PC (57) ABSTRACT

According to an embodiment of the invention, a DS-CDMA receiver receives an input signal which comprises a plurality of received signals that are received over a corresponding plurality of antennae. These signals are demodulated and sampled to create digital signals. The digital signals are decorrelated and each of the decorrelated signals are multiplied by a weight to derive weighted estimates. The weighted estimates are summed to generate an estimate of an information symbol. The weights are based upon a cross correlation between the decorrelated signals and a desired signal. According to the invention, this cross correlation may be derived by filtering a pilot signal.

45 Claims, 5 Drawing Sheets

TWO STEP SIGNAL RECOVERY SCHEME FOR A RECEIVER

BACKGROUND OF THE INVENTION

1. Field of the Invention

This invention relates to receivers, and, more particularly, to methods and apparatus for recovering information symbols from a plurality of signals.

2. Description of the Related Art

In many types of communications systems, it is desirable to employ antenna arrays to receive signals. Such arrays provide superior performance since they allow for taking advantage of the directionality of received signals. For example, if a basestation is receiving signals from two mobiles with differing angles of arrival, a method may be devised to effectively increase the antenna response in the direction of a desired signal, while decreasing the response in the direction of an undesired interferer. The use of this spatial information to allow greater network capacity is commonly called Space Division Multiple Access (SDMA).

There are two basic methods for processing information from multiple antennae ("antenna tracking"). One method involves simply determining which of the antennae is receiving the "best" signal and discarding the other signals. Although this method is relatively easy to implement, it discards information and may thus not be optimal. The second method involves forming some combination of the signals received by the multiple antennas (hereafter the "combination approach"). This method generally provides better results than the previously discussed method but is more difficult to implement.

In direct sequence Code Division Multiple Access ("CDMA") systems ("DSCDMA") with multiple antennae, implementing the combination approach for a basestation is further complicated because the received signals are used for multiple purposes. For example, a basestation actively demodulates several mobile station signals, all of which occupy the same frequency spectrum and are present in the same set of antenna signals. Further, some systems use multiple basestations simultaneously transmitting the same data to the mobile ("soft handoff"), so that the signal from each basestation is present in the set of antenna signals, and each basestation's signal must first be processed independently. Finally, DS-CDMA receivers are subject to the typical multipath problem in which several copies of the same signal arrive at the receiver through different paths.

In addition to the complications arising from multiple use, the implementation of the combination approach is further complicated by the ever increasing need for antenna tracking to be performed quickly. Receivers generally should make antenna tracking updates at a rate given by the signal bandwidth; thus, updates generally must occur more frequently as the bandwidth of a system increases. Therefore, it would be desirable to improve upon the speed of conventional antenna tracking systems, especially as bandwidth requirements continue to increase.

One conventional combination approach for performing antenna tracking involves the use of Wiener filtering. Wiener filtering, including LMS ("Least Mean Square") or RLS ("Recursive Least Squares"), is commonly used to implement the combination approach because it is frequently superior to other methods such as beamsteering. However, conventional Wiener filtering combination approaches are subject to certain limitations.

Specifically, in receivers that employ conventional Wiener filtering combination approaches, the receiver's timing acquisition may not be able to take advantage of multiple antennae. This inability occurs because a receiver must acquire its timing over a certain interval, and antenna tracking cannot be performed until this acquisition is complete. Thus, in such systems, timing acquisition can not be implemented with a combination approach. It would be desirable to use the more accurate combination approach in connection with acquisition of signal timing.

A similar "chicken and egg" problem for receivers that employ conventional Wiener filtering may occur in the case of multipath signals (i.e. multiple copies of the same signal arriving at a receiver) being tracked from a single transmitter. In such instances, typically some finite number of fingers are assigned to demodulate each of several different received time delays. As the channel characteristics change, these finger assignments must change. Searching for these delays is hampered analogously to the timing acquisition process discussed above: the combination approach can not converge to a solution until a timing is selected, implying the timing must in some sense be selected without the advantage of the antenna tracking.

CDMA receivers that implement the combination approach with Wiener filtering have still further limitations. In such receivers, the weights that are applied to the different antenna signals before those signals are combined must be calculated at the "chip" rate, which is a multiple of the symbol rate. It would be desirable to perform antenna tracking at the lower symbol rate (i.e. after despreading has occurred), thus reducing hardware requirements.

CDMA receivers that are responsible for multiple users (e.g. a basestation) confront still further difficulties in connection with implementing the combination approach. One way to implement the above approach using Wiener filtering in a DSCDMA receiver would be to perform LMS or RLS for each finger for which the receiver is responsible. (There may be multiple fingers per user, as will be further described in the Detailed Description of the Invention.) However, this would be quite computationally intensive; given the previously described constraints on DS-CDMA receivers, this may make using LMS or RLS difficult. On the other hand, as previously mentioned, the combination approach is superior to an approach that simply selects one of many signals that arrive at a receiver.

Thus, there is a need for a DS-CDMA receiver with an antenna array that can efficiently implement the combination approach for multiple users (or multiple receive paths). More broadly, there is a need for a receiver that can implement the combination approach with reduced computational complexity.

SUMMARY OF THE INVENTION

These and other needs are met by the present invention. According to an embodiment of the invention, a DS-CDMA receiver receives an input signal which comprises a plurality of received signals that are received over a corresponding plurality of antennae. These signals are demodulated and sampled to create digital signals, which may be represented by a vector $u_{before}[n]$, which has one element for each of the plurality of input signals. The vector $u_{before}[n]$ is decorrelated by multiplying it with a decorrelation matrix to create a vector $u_{after}[n]$ which thus represents a modified version of the input signal. The decorrelation matrix is generated by performing certain operations derived from standard "square root" RLS methodology. A weight vector that is specific to each finger is derived, and each finger's weight vector is multiplied by the vector $u_{after}[n]$ to recover a finger's estimate of a user's information symbol. Finally, the estimates for each finger corresponding to a particular user are added to derive an estimate of such user's information symbol. The weight vector for each finger is based upon a cross correlation between the decorrelated received signals, represented by $u_{after}[n]$, and the desired signal. According to the invention, this cross correlation may be derived by filtering a pilot signal.

Although decorrelation is relatively computationally intensive, it need only be performed once for a particular block of data to produce the vector $u_{after}[n]$. Since the updating of weight vectors is relatively simple, a computationally intensive RLS calculation need not be performed once for each of the users, decreasing the receiver's hardware requirements (e.g. lower MIPS for a processor, fewer gates in an integrated circuit, and/or less current in an integrated circuit).

An alternate embodiment is disclosed in which an input signal is not decorrelated but instead multiplied by an inverse of a correlation matrix to create a modified version of the input signal. In this case, the weights applied to the modified version of the input signal to derive a symbol estimate are based on a cross correlation between the input signal (unmodified) and a desired signal.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

This specification describes a methods and apparatus pertaining to a DS-CDMA receiver with multiple antennae. However, it will be appreciated that the present invention is not restricted to DS-CDMA and is not restricted to multiple antennae systems. Instead, it will be appreciated that the present invention is applicable to any receiver that must process a plurality of received signals, whether or not those signals are received over different antennae. For example, the present invention may be employed where the multiple signals comprise signals derived from a signal that is applied to a at tapped delay line.

As used herein, a "version" of a signal is the signal itself or the result of processing the signal. For example, a filtered signal is a version of the signal that has been filtered. As used herein, an "information symbol" is an item of information that it is desired to recover, whether or not the information symbol represents the final information that is provided to the user. For example, data that is recovered from input signals and is then provided to a Viterbi decoder would constitute information symbols even though such data must be decoded. One "information symbol" may comprise a plurality of bits. For example, in QPSK, one information symbolt comprises 2 bits of information.

As used herein, a "receive path" is a distinct signal path that a receiver is capable of resolving. For example, in CDMA, a carrier signal contains a plurality of users' signals; each of these signals is a "receive path." As another example for CDMA, there may be more than one finger for a particular user, where each finger corresponds to a distinct "receive path." Different fingers for the same user track different signal paths as distinguished by their time of arrival. For example, one finger may track a direct path from a transmitter to the receiver while another finger may track a path wherein a signal bounces off of a building. As another example, different fingers can be assigned to different transmitters, typically basestations, transmitting the same information symbols but distinguished by a code; this procedure is known as "soft handoff."

This specification is divided into five sections. Section I is an overview of the architecture of an embodiment of a DS-CDMA receiver constructed in accordance with the present invention. As will be described, a plurality of received signals are decorrelated and weights are applied to the decorrelated signals. The weighted decorrelated signals are then summed to derive a symbol estimate. Section II develops a framework for mathematically describing multiple antennae receivers and thus for describing a plurality of received signals. Section III, utilizing the framework developed in Section II, describes the generation of a decorrelation matrix that is used to perform the decorrelation referenced in Section I. In addition, Section III describes methods for generating the weights that are applied to the decorrelated signals. Section IV describes an extension to the architecture described in Sections I through III that may be employed where the decorrelation matrix may be poorly conditioned. The specific embodiment of the present invention described in Section I is based upon two step Wiener filtering, according to the present invention. Section V describes the present invention's use of two step Wiener filtering more generally and then describes an alternate embodiment based on that filtering.

SECTION I

Figure 1:
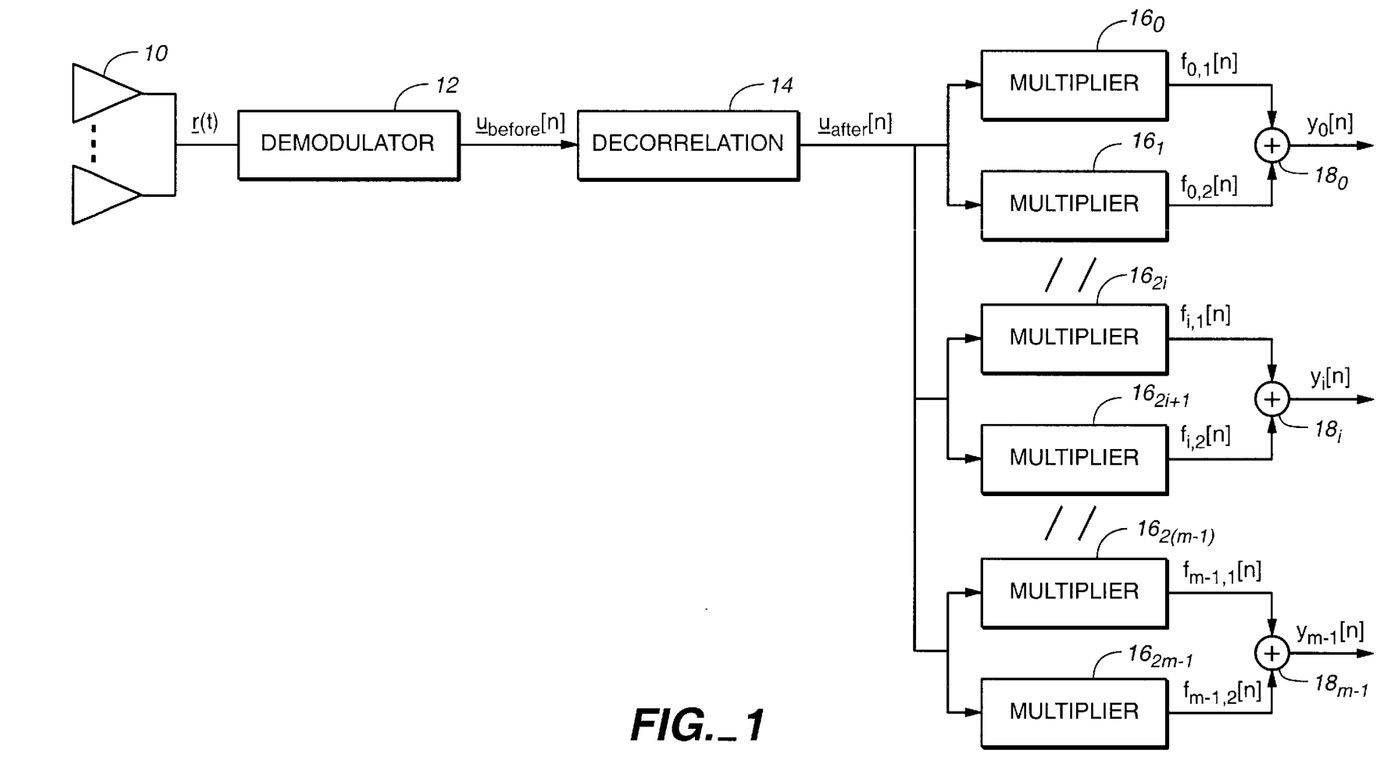
FIG. 1 is a block diagram of a DS-CDMA receiver constructed in accordance with an embodiment of the present invention.

FIG. 1 is a block diagram of an embodiment of a DS-CDMA multiple antennae receiver for a plurality of users (shown as m users) that employs the present invention's symbol recovery system. As shown, a plurality of p reception elements, shown as a plurality of antennae 10, receive through a communications channel an input signal that comprises a plurality of received signals $\{r_0(t), r_1(t) \ldots r_{p-1}(t)\}$ respectively and provide them to a demodulator 12, which outputs a digital signal time indexed by the letter n. In other types of technologies, the reception elements may comprise, for example, different fiber optic channels or the like or taps of a delay line.

The output of the demodulator 12 is represented as a vector $u_{before}[n]$, with elements that equal the complex baseband of the signals $\{r_0(t), r_1(t) \ldots r_{p-1}(t)\}$ after they have been demodulated and sampled. A possible composition of vector $u_{before}[n]$ will be more thoroughly described in Section II.

Vector $u_{before}[n]$ is provided to a decorrelation block 14, which decorrelates the vector $u_{before}[n]$ by deriving a decorrelation matrix $G^{-\frac{1}{2}}[n]$ that is based on the correlation of the input signal $u_{before}[n]$, as will be further described in Section III, and outputs a vector $u_{after}[n]$, which is the modified (decorrelated) version of the received signals. As will be further described in Section III, the decorrelation matrix $G^{-\frac{1}{2}}[n]$ is derived from a matrix (hereafter "$\hat{R}[n]$") that represents an estimate of the correlation of the received signals. Other types of decorrelation (orthogonalization) may be used, including without limitation Gramm-Schmidt orthogonalization.

For recovery of an estimate of a particular user's information symbol, which estimate is represented in the Figure as $y_i$ for user i, estimates $f_{i,1}$ and $f_{i,2}$ for different fingers are added together by one of the adders 18. (It will be appreciated that the outputs of the fingers must be time aligned.) For ease of illustration, only two fingers are shown per user but it will be appreciated that the present invention may be employed with any number of "fingers."

Figure 2:
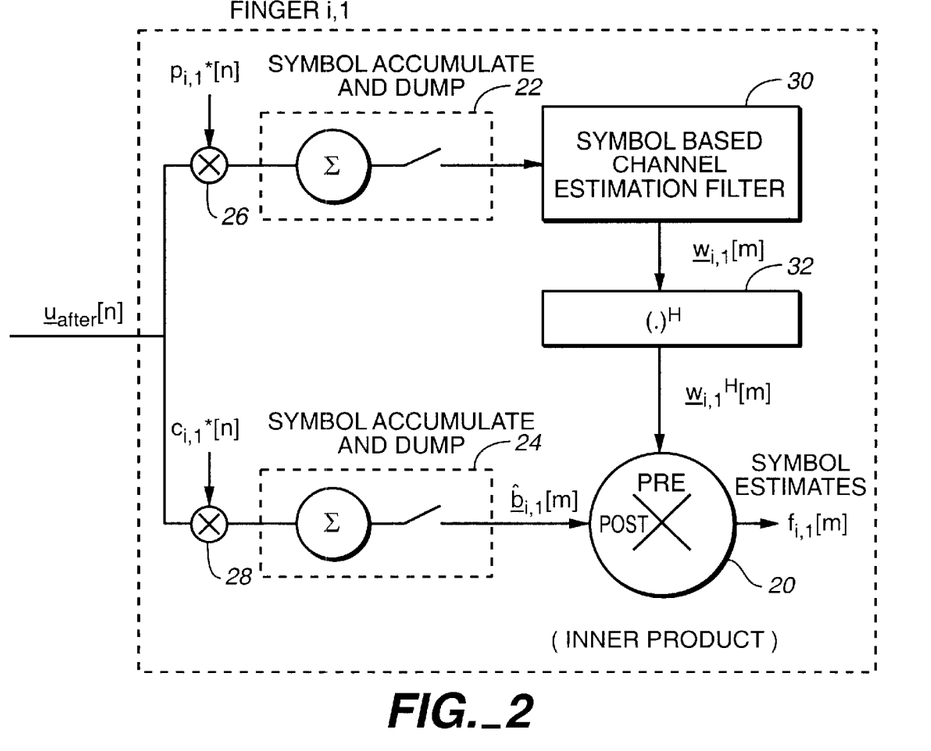
FIG. 2 is a block diagram of one of a plurality of multiplier/despreader blocks shown in FIG. 1.

For recovery of the estimates $f_{i,1}$ and $f_{i,2}$ for user i, the vector $u_{after}[n]$ is processed with information that is specific to the receive path (i.e. fingers 1 and 2, respectively, for user i) in question. In particular, with respect to the estimate $f_{i,1}$, the vector $u_{after}[n]$ is decoded (despread with a user specific code in CDMA) by a multiplication/despreader block $16_j$, which is one of a plurality of multiplication/despreader blocks $16_0$ through $16_{2m-1}$, to create a plurality of initial symbol estimates for the finger in question, one estimate for each of the antennae. Each of these initial finger estimates, which are represented by vector $\hat{b}_i[m]$ in FIG. 2, is multiplied by a weight that is generated from the input signals; essentially, the weight corresponds to the channel response for user i at a particular time delay from a transmitter through the air, the antennae 10 and decorrelation block 14. In FIG. 2, these weights are represented by a vector $w_i[m]$, whose contents will be further described below in this Section and in Section III. The weighted estimates are then summed, which results in the symbol estimate $f_{i,1}$. (These multiplication and summing operations are depicted in FIG. 2 as the inner product of the vectors $\hat{b}_i[m]$ and $w_i[m]$).

Although the decorrelation block 14 in FIG. 1 is relatively computationally intensive, it need only be performed once for a particular block of data to produce the vector $u_{after}[n]$; the generation (update) of the weight vector $w_i$ is relatively simple. Thus, a computationally intensive RLS calculation need not be performed once for each of the 2m fingers, thereby decreasing the receiver's hardware requirements. Further, acquisition searches may be performed on the output ($u_{after}[n]$) of the decorrelation block 14 without a training period, in which case the decorrelation block 14 should output $u_{after}[n]$ essentially continuously.

The architecture shown in FIG. 1 has many advantageous features. For example, for DS-CDMA systems that employ pilots, the derivation of the weight vector $w_i$ is similar to "pilot" or "channel" estimation performed by existing DS-CDMA modems. Therefore, the architecture shown in FIG. 1 may be easily employed in systems that use such modems.

Still another advantage of the architecture shown in FIG. 1 is that bursty signals, which may suddenly appear, can be very quickly tracked and acquired. When the bursty signal is a relatively small portion of the total received power, the switching on and off of this signal modifies the actual correlation matrix R[n] of the received vector only slightly, so that the decorrelation matrix $G^{-\frac{1}{2}}[n]$ changes only slightly. Thus, the decorrelated vector $u_{after}[n]$ is still nearly decorrelated the instant after a bursted signal begins, even prior to the decorrelating matrix $G^{-\frac{1}{2}}[n]$ having converged to a new decorrelation value. This situation, where a desired signal is low powered relative to the total received signal, is expected in applications that use antenna arrays in DS-CDMA, because the use of CDMA and SDMA implies many users on the same frequency channel. Thus, acquisition performance will benefit from the antenna diversity, though some slight transient degradation due to the slight perturbation from decorrelation may occur.

The architecture illustrated in FIG. 1 has still further advantageous features. For example, the architecture illustrated in FIG. 1 allows for decoupling of the "decorrelation" component from a "pilot recovery" or weight generation component, which may be performed by the multiplication/despreader blocks 16 as will be further described below. That is, these may be two essentially independent processes and could, for example, be carried out on different integrated circuits. Thus, the performance of the "decorrelation" component and the "pilot recovery" component each can to some extent be analyzed and optimized independently. An additional benefit of the decoupling of the "decorrelation" component from the weight generation component is that the more noise sensitive weight generation may be performed in a more computationally intensive way (e.g. with a symbol based pilot filter) than the more complicated "decorrelation."

Still further, the performance of the receiver is relatively unaffected by the eigenvalue spread of the received correlation matrix $\hat{R}[n]$. As will be further described in Section IV, modifications to the decorrelation block 14 can be made to compensate for poor conditioning with no consideration in the recovery stage to the conditioning. Thus each demodulation path can remain ignorant of any conditioning effects.

Still further, floating point or complicated fixed point computation may be performed by the decorrelation block 14, which, in the preferred embodiment, obviates the need to perform such complicated computations in the signal recovery stage implemented by the multiplication/despreader blocks 16.

Still further, the output $u_{after}[n]$ of the decorrelation block 14 is a vector of signals with equal and known complex baseband. There will be no time variation of the power of these signals, and considering the spread nature of the signal a small number of bits can be used to represent the input signals at this point.

FIG. 2 is a block diagram of the multiplication block for a DS-CDMA receiver that employs pilot signals. A pilot signal is a signal transmitted to a receiver but also known a priori; the receiver may thus estimate the channel response by comparing the received pilot signal to the known value.

As shown in FIG. 2, the symbol estimate $f_{i,1}$ is derived by a multiplier/summer 20 that takes the inner product of a weight $w_i$ and a despread (decoded) version $\hat{b}_i[n]$ of the vector $u_{after}[n]$. As previously described, the despread (decoded) version $\hat{b}_i[n]$ of the vector $u_{after}[n]$ represents a plurality of initial estimates, one estimate for each of the p antennae, of the desired information symbol $f_{i,1}$. Each of these initial estimates is multiplied by one of the weights $w_i$, which is derived from an estimate of a pilot signal $P_i$, as will be further described in Section III.

The estimate of the pilot signal $p_i$ and the despread version $\hat{b}_i[n]$ of the vector $u_{after}[n]$ are derived from the vector $u_{after}[n]$ by multipliers 26 and 28, respectively, which multiply $u_{after}[n]$ by the complex conjugates of a despreading code $c_i$ and the known pilot signal $p_i$. The results are accumulated by accumulators 22 and 24, respectively, over one information symbol period, and then cleared from the pertinent accumulator in preparation for the next symbol period.

The estimate of the pilot signal $p_i$ is then provided to a filter 30, which may be a simple Infinite Impulse Response (IIR) filter or a Finite Impulse Response (FIR) filter, which implements the filtering described in Section III on a symbol sample rate basis as will be further described in Section III, to derive the weights $w_i$. The vector $w_i$ is transposed by a transposer 32 and the inner product of the transposed $w_i$ and vector $b_i[n]$ is generated by the multiplier/summer 20 as previously described, resulting in one finger's estimate $f_{i,1}$ for an information symbol for user i.

Figure 3:
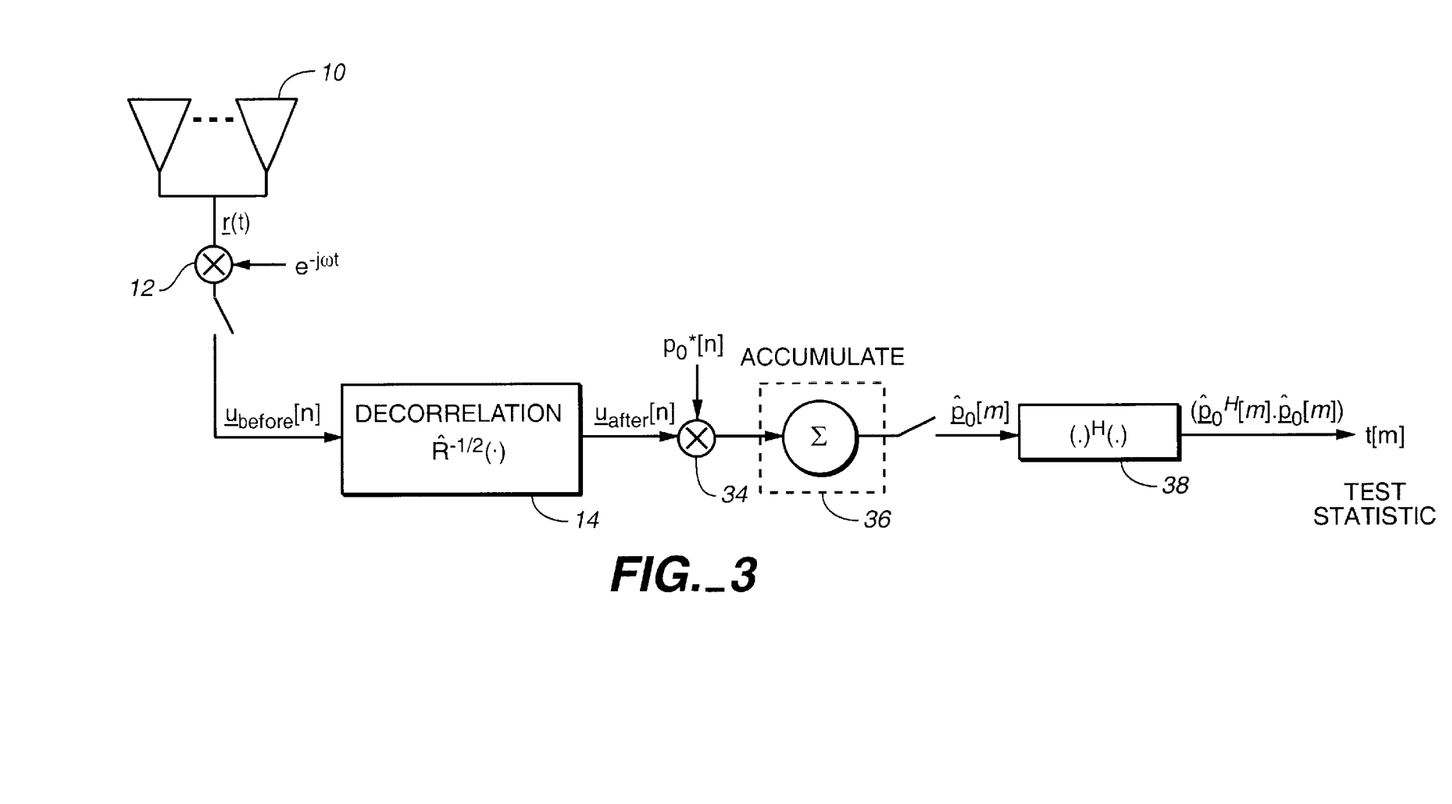
FIG. 3 is a block diagram of a DS-CDMA receiver, constructed in accordance is with an embodiment of the present invention, that generates a test statistic.

FIG. 3 is a simplified block diagram of a receiver according to the present invention that includes the generation of a simple test statistic, used to compare to a threshold or to other test statistics to determine if the particular code and code timing applied is valid. As shown, the signal $u_{after}[n]$, which may be generated in the manner previously described, is provided to a multiplier 34 which multiplies $u_{after}[n]$ by the complex conjugate of a pilot signal $p_0$ and the resulting vector is accumulated by accumulator 36 over a symbol period. The result is provided to multiplier/summer 38, which generates the inner product of the resulting vector and its transposition to generate a test statistic.

As will be appreciated, several such systems as shown in FIG. 3 could be simultaneously running on the same decorrelated vector $u_{after}[n]$ and other receivers could be demodulating with fingers that use the same vector $u_{after}[n]$. The test may be performed for all of the possible codes and timings $p_0[n-T]$. The largest generated test statistic, or the first test statistic to exceed the threshold, would be considered to correspond to the appropriate code and a good usable path delay at which to assign a finger.

SECTION II

This section describes a typical composition of the vector $u_{before}[n]$.

Figure 4:
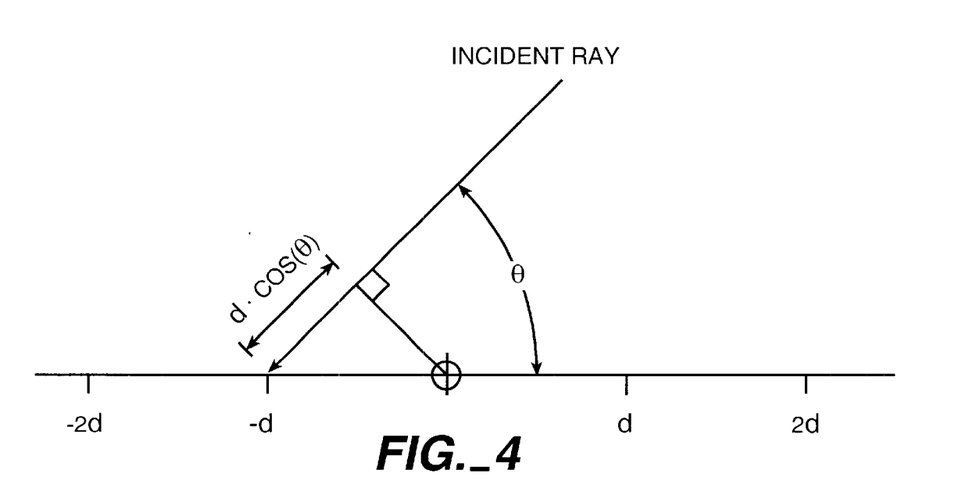
FIG. 4 shows the comparison of the distances traveled by a signal received by adjacent antennas in an antenna array.

In a receiver with multiple antennae, the spacing of the antennae will result in different antennae receiving the identical signal at different times, as illustrated in FIG. 4. In FIG. 4, an antenna element is assumed to be at each point marked (m)d, where m is an integer. Although FIG. 4 assumes an equal distance between each antenna, it will be appreciated that the present invention is not limited to such equal length schemes nor is it limited to linear arrays; any other antenna geometry (e.g. circular arrays) may be used.

Still with reference to FIG. 4, considering a single point source in the far field, each antenna element receives a version of the signal delayed by the additional distance traveled, so that using the left most element as the reference and considering the geometry shown in FIG. 4, for p elements indexed 0:(p−1), the value of the received signal at an element m is a delayed (or advanced) version of the received signal at element 0 as follows:

$r_m(t) = r_0(t - m\ d\ \cos(\theta))$.

The received signal is a carrier modulated by a complex baseband signal s(t), with the carrier frequency being $\omega/2\pi$ Hz. Using a complex wave model, the received signal is:

$r_0(t) = \exp(j\omega t) \cdot s(t)$; and $r_m(t) = \exp(j\omega(t - m \cdot d \cdot \cos(\theta))) \cdot s(t - m\ d \ccdot \cos(\theta))$.

A common assumption applied is that the modulating signal is narrow band, so that:

$s(t) \approx s(t - m \cdot d \cdot \cos(\theta))$; and $r_m(t) \approx \exp(j\omega t - j\omega m d \cdot \cos(\theta)) \cdot s(t) = \exp(j\omega m d \cdot \cos(\theta)) \cdot r_0(t)$.

Define the directional vector $d(\theta) = [1 \exp(j\omega d \cdot \cos(\theta))\ \exp(j 2\omega d \cdot \cos(\theta)) \ldots \exp(j(p-1)\omega d \cdot \cos(\theta))]^T$ then the received vector generated by a signal originating from angle $\theta$ is $r(t) = [r_0(t) r_1(t) \ldots r_{p-1}(t)]^T = s(t) \cdot d(\theta) \cdot \exp(j\omega t)$ In general, there may be superposition of multiple received paths, from differing angles and with different complex gains $\alpha$, so that the direction vector of the desired signal of an the $i^{th}$ user at a specific, resolvable delay is:

$d_i = \Sigma_k \alpha_{i,k} d(\theta_{i,k})$

There is also noise v(t), assumed to be white and uncorrelated from antenna to antenna, and interference from users j≠i. Then $r(t) = (s_i(t) \cdot d_i + \Sigma_{j\ not\ equal\ to\ i} s_j(t) d_j + v(t)) \cdot \exp(j\omega t)$ Each antenna signal is downconverted to baseband to remove the carrier, and its complex baseband sampled to give the vector $u_{before}[n]$ as follows:

$u^{before[n]} = s_i[n] \cdot d_i + \Sigma_{j\ not\ equal\ to\ i} s_j[n] d_j + v[n]$;

where n is an integer.

For a CDMA system with a pilot $p_i[n]$, $s_i[n] = p_i[n] + c_i[n] b_i[n/K]$; where $b_i[n/K]$ = the over sampled information symbols transmitted (sampled at the chip rate, so that b[n/K] is constant over one symbol comprised of K chips);

$c_i[n]$ = the spreading code applied to the transmitted bits, "known" by receiver;

p[n]p*[n]=1
c[n]c*[n]=1
b[n/K]b*[n/K]=1.

Letting $x_i[n] = \Sigma_{j\ not\ equal\ to\ i} s_j[n] d_j + v[n]$, $u_{before}[n]$ becomes $u_{before}[n] = (p_i[n] + c_i[n] b_i[n/K]) \cdot d_i + x_i[n]$.

(Writing $u_{before}$, which incorporates information for all users, from the "perspective" of a user i will simplify certain calculations described in Section III.)

SECTION III

This section describes the decorrelation performed by the decorrelation block 14 shown in FIG. 1 and the derivation of the weights $w_i$. The decorrelation block 14 is then described.

Next, a general formula for the weights is described, followed by a more specific formula for the weights $w_i$ for a DS-CDMA system. Finally, an alternative formula for the weights $w_i$ is then derived for a DS-CDMA system that employs a pilot signal, which formula may be implemented by the filter 30 shown in FIG. 2.

Decorrelation Block

The decorrelation block 14 creates the vector $u_{after}[n]$ based upon the value of $u_{before}[n]$. In particular:

$$u_{after}[n] = G^{-\frac{1}{2}}[n] u_{before}[n];$$

where $G^{-\frac{1}{2}}[n]$, which is a matrix derived by the decorrelation block 14, is the Cholesky decomposition of an estimated correlation matrix $\hat{R}[n]$ which represents the correlation of the input signals represented by the vector $u_{before}$. In the preferred embodiment, $\hat{R}[n]$ is generated by performing steps derived from standard RLS methodology, which involves generating $\hat{R}[n]$ based upon values of $\hat{R}[n-1]$. More particularly, $$G[n] = \hat{R}[n] = (1-\lambda)\Theta[n];$$

$$\Theta^{-1}[n] = \lambda^{-1}\Theta^{-1}[n-1] - \frac{\lambda^{-2}\Theta^{-1}[n-1]u_{before}[n]u_{before}^H[n]\Theta^{-1}[n-1]}{1+\lambda^{-1}u_{before}^H[n]\Theta^{-1}[n-1]u_{before}[n]} =$$

$$\lambda^{-1}\Theta^{-1}[n-1] - \lambda^{-2}\Theta^{-1}[n-1]u_{before}[n]r^{-1}[n]u_{before}^H[n]\Theta^{-1}[n-1]$$

$$r^{-1}[n] = \frac{1}{1+\lambda^{-1}u_{before}^H[n]\Theta^{-1}[n-1]u_{before}[n]}$$

Deriving $G^{-\frac{1}{2}}[n]$ from $\hat{R}[n]$ (i.e. taking the "square root" of $\hat{R}[n]$) could potentially be done in many ways. There exists in the literature a suitable method derived from the "square root Kalman filtering" described in various references, including: Golub, G. H. and C. F. Van Loan (1996). Matrix Computations, Third Edition, John Hopkins University Press, Baltimore, Md.; Haykin, Simon (1996). Adaptive Filter Theory, Third Edition, Prentice Hall, Upper Saddle River, N.J.; and Sayed, A. H., and T. Kailath (1994). "A state space approach to adaptive RLS filtering," IEEE Signal Processing Magazine, vol. 11, pp. 18–60, each of which are herein incorporated by reference.

More particularly, (,using the above equations for $\Theta^{-1}$ and letting $u[n]=u_{before}[n]$), the following procedure may be performed.

Define a matrix M as follows:

$$\begin{bmatrix} 1 & \lambda^{-1/2}\underline{u}^H[n]\Theta^{-1/2}[n-1] \\ \underline{0} & \lambda^{-1/2}\Theta^{-1/2}[n-1] \end{bmatrix}$$

If a unitary matrix U[n] is found that can annihilate the entries of the upper right vector of the matrix M, then it can be shown that the result is $$\begin{bmatrix} 1 & \lambda^{-1/2}\underline{u}^H[n]\Theta^{-1/2}[n-1] \\ \underline{0} & \lambda^{-1/2}\Theta^{-1/2}[n-1] \end{bmatrix}$$

$$U[n] = \begin{bmatrix} r^{1/2}[n] & \underline{0}^T \\ \lambda^{-1/2}\Theta^{-1/2}[n-1]\underline{u}[n]r^{-1/2}[n] & \Theta^{-1/2}[n] \end{bmatrix}$$

The annihilation of the upper right vector can be performed with a series of Givens rotations (see [Haykin,. 1996] or [Golub, 1996]). Each rotation is a unitary transformation, and the product of the rotations is thus unitary. The Givens rotation is performed by post-multiplication by a Givens matrix. The matrix differs from the identity only in 4 entries, falling at the four corners defined by 2 rows and 2 columns, as shown below for a Givens matrix U. The upper right vector is annihilated one entry at a time, using p (where p is the number of reception elements) rotation matrices with s and c properly determined and obeying the constraints:

$$c^2 + |s|^2 = 1$$

c = real $$U = \begin{bmatrix} 1 & & & & & & & & \\ & \ddots & & & & & & & \\ & & 1 & & & & & & \\ & & & c & & s^* & & & \\ & & & & 1 & & & & \\ & & & & & \ddots & & & \\ & & & & & & 1 & & \\ & & & -s & & c & & & \\ & & & & & & & 1 & \\ & & & & & & & & \ddots \\ & & & & & & & & & 1 \end{bmatrix}$$

$G^{-\frac{1}{2}}[n]$ may then be obtained simply by scaling $\Theta^{-\frac{1}{2}}[n]$.

Systolic array implementations to perform this kind of operation exist can be found in [Haykin, 1996]. The rotations can be performed so as to maintain the triangular nature of $G^{-\frac{1}{2}}[n]$, thereby decreasing the required number of calculations. Obtaining The proper selection of the rotations also ensures that the diagonal of the lower triangular matrix is positive, which is the unique Cholesky decomposition solution. Maintaining the triangularity and maintaining the positive diagonal are important, the first to minimize calculations and the latter to provide less time variation in the structure of the matrix, which is helpful in connection with various operations described herein.

Note that the determination of s and c at each step also involves a square root, so that each iteration of the decorrelation matrix estimation involves M square roots. This is a more complicated digital operation, preferably performed with the help of look up tables.

General System—Derivation of the Weights

As described with reference to FIG. 1, leaving fingers aside, the output signal for a user i is equal to a vector $u_{after}[n]$ multiplied by a weight vector $w_i$. Specifically, the output signal $y_i[n]$ for a user i is equal to $w_i^H u_{after}[n]$ (where the superscript H denotes the Hermetian transposition of a matrix), where the weights $w_1$ are equal to:

$$w_i[n] = (1-\lambda) \cdot z_i[n]; \text{ where}$$

$$z_i[n] = \sum_{k=-\infty}^{n} \lambda^{n-k} \underline{u}_{after}[k] v_i^*[k]$$

$$= \lambda z_i[n-1] + \underline{u}_{after}[n] v_i^*[n]$$

λ is an exponential "forgetting factor"; and $v_i[n]$ is the desired symbol (i.e. the signal transmitted from a transmitter) for user i at interval n. The above equations are modified RLS equations where the assumption has been made that the scaled RLS sample correlation matrix is the identity matrix.

As shown above, in a preferred embodiment the weights for a particular user i are based on a cross correlation between the decorrelated vector $u_{after}$ and the desired signal, weighted by a simple exponential filter. Although a simple exponential filter has been used above, any filtering shape desired can be applied. The exponential forgetting factor is commonly applied because it is the lowest complexity method, lending itself to the simplified recursions of RLS. The sections below will derive more specific formula for the weights in the context of a CDMA system.

CDMA Generally—Derivation of Weights

As described above, in a preferred embodiment the weights are equal to:

$$w_i[n]=(1-\lambda)\cdot z_i[n]; \text{ where}$$

$$z_i[n] = \sum_{k=-\infty}^{n} \lambda^{n-k} u_{after}[k] v_i^*[k]$$

$$= \lambda z_i[n-1] + u_{after}[n] v_i^*[n]$$

If the information symbols $b_i[n/K]$ were known for a user $i$, then $c_i[n]b_i[n/K]$ (using the symbols described in Section II) would be used as the desired signal $v_i[n]$ for user $i$, in which case, $w_i[n]$ becomes $$w_i[n]=(1-\lambda)\cdot z_i[n]; \text{ where}$$

$$z_i[n] = \sum_{k=-\infty}^{n} \lambda^{n-k} u_{after}[k] c_i^*[k] b_i^*[k/K]$$

Substituting $$u_{after}[n]=G^{-1/2}[n]u_{before}[n]; \text{ and}$$

$$u_{before}[n]=(p_i[n]+c_i[n]b_i[n/K])\cdot d_i+x_i[n] \text{ (from Section II), yields:}$$

$$w_i[n]|_{b_i[k/K]} =$$

$$(1-\lambda)\sum_{k=-\infty}^{n} \lambda^{n-k} u_{after}[k] c_i^*[k] b_i^*[k/K] = (1-\lambda)$$

$$\sum_{k=-\infty}^{n} \lambda^{n-k} G^{-1/2} d_i c_i[k] b_i[k/K] c_i^*[k] b_i^*[k] +$$

$$(1-\lambda)\sum_{k=-\infty}^{n} \lambda^{n-k} G^{-1/2} (X[n]) c_i^*[k] b_i^*[k/K] =$$

$$(1-\lambda)\sum_{k=-\infty}^{n} \lambda^{n-k} G^{-1/2} d_i[k] + (1-\lambda)\sum_{k=-\infty}^{n} \cong$$

$$G^{-1/2} d_i[n] +$$

where the final approximation is based on the assumption that the channel, and hence both $G^{-1/2}[n]$ and $d_i[n]$ remain constant over the summation period. The remaining terms are relatively small since there is no cross correlation and in CDMA can be assumed to be statistically similar to decorrelated gaussian noise by virtue of summations over many samples. Thus, although the weights are based on a cross correlation between the decorrelated vector $u_{after}$ and the desired signal, this cross correlation need not be explicitly performed.

Although $b_i[m]$ is not known precisely by the receiver, it may be assumed that a hard decision of the symbol estimate $y_i$ is the correct transmitted bit and thus the desired signal. This technique is known as decision directed feedback.

DS-CDMA With a Pilot Signal—Derivation of Weights

As described above, the calculation of the weights $w_i$ depends upon the value of the desired signal, which as mentioned above is not known precisely by the receiver. However, instead of making the assumption a hard decision of the symbol estimate $y_i$ is the desired signal, a pilot signal may be used to derive the weights. Pilot signals are provided in coherent communications to facilitate channel estimation in the receiver. In DS-CDMA systems, this pilot may be time multiplexed or code multiplexed with the data signal. As long as the time multiplexing period is small enough to capture channel variations, there is no substantial difference between the two methods in terms of performance or applicability of the presently described system. For notational simplicity, a code multiplexed pilot will be assumed but it will be appreciated that the present invention may be employed where the pilot is time multiplexed with the data signal.

(Note that, in general, the Wiener filter derived by using a pilot differs from that derived given the exact desired sequence (the data) by a constant factor, given by the square root of the ratio of transmit power of the pilot to that of the data channel.)

As described above, the weights are equal to:

$$w_i[n]=(1-\lambda)\cdot z_i[n]; \text{ where}$$

$$z_i[n] = \sum_{k=-\infty}^{n} \lambda^{n-k} u_{after}[k] v_i^*[k]$$

$$= \lambda z_i[n-1] + u_{after}[n] v_i^*[n]$$

If a pilot signal $p[n]$ is transmitted, and the receiver "knows" the exact value of the pilot signal, then according to the present invention, the desired signal $v_i[n]$ for a user $i$ may be taken as equal to the pilot signal $p_i[n]$ for that user, in which case, $w_i[n]$ becomes $$w_i[n]=(1-\lambda)\cdot z_i[n]; \text{ where}$$

$$z_i[n] = \sum_{k=-\infty}^{n} \lambda^{n-k} u_{after}[k] p_i^*[k]$$

$$= \lambda z_i[n-1] + u_{after}[n] p_i^*[n]$$

Substituting $$u_{after}[n]=G^{-1/2}[n]u_{before}[n]; \text{ and}$$

$$u_{before}[n]=(p_i[n]+c_i[n]b_i[n/K])\cdot d_i+x_i[n] \text{ (from Section II),}$$

yields:

$$w_i[n]|_{p_i[n]} = (1-\lambda)\sum_{k=-\infty}^{n} \lambda^{n-k} u_{after}[k] p_i^*[k] =$$

$$(1-\lambda)\sum_{k=-\infty}^{n} \lambda^{n-k} G^{-1/2} \alpha p_i[k] d_i p_i^*[k] +$$

$$(1-\lambda)\sum_{k=-\infty}^{n} \lambda^{n-k} G^{-1/2} (c_i[k] b_i[k] d_i[k] + x_i[ =$$

$$(1-\lambda)\sum_{k=-\infty}^{n} \lambda^{n-k} G^{-1/2} d_i[k] + (1-\lambda)\sum_{k=-\infty}^{n} \cong G^{-1/2} d_i[n] +$$

Thus, it can be seen that the use of the pilot as the desired signal yields the same result as above where $b_i[m]$ was used as the desired data. (As before, the remaining terms portrayed as ". . . " are relatively small since there is no cross-correlation, and in CDMA applications can be assumed to be statistically similar to decorrelated gaussian noise by virtue of summations over many samples.)

The equation for $z_i[n]$, indicates that the weights $w_i$ may be derived by passing the accumulation of the signal $u_{after}[k]p_i^*[k]$, which is provided by the output of the accumulator 22 in FIG. 2, through an appropriate filter and the filter 30 may be designed accordingly. As will be further described below, since the accumulator 22 provides a despread version of the signal $u_{after}[k]p_i^*[k]$, the filter 30 may operate at the symbol rate. (I.e., a despread signal is by definition provided at the symbol rate, the frequency of which is 1/K the frequency of the chip rate, where there are K chips per symbol.) As further described in the following paragraphs, the filter 30 may be designed a priori based upon assumed channel conditions or it may be adaptively adjusted by means such as RLS or LMS. The filter 30 need not be the exponential weighting of λ inherited from standard RLS but may be any desired filtering shape. The exponential weighting is commonly applied because it is the lowest complexity method, lending itself to the simplified recursions of RLS.

More particularly, considering the formulation of the exponentially weighted crosscorrelation $z_i[n]$, it will be appreciated that the sample crosscorrelation $u_{after}[n] \cdot p_i^*[n]$ is being filtered by a filter impulse response equivalent to a single tap IIR (Infinite Impulse Response) filter. Since the ideal value for the weight is given by $E\{u_{after}[n] \cdot p_i^*[n]\}$, the problem may be considered to be the estimation of the value of $E\{u_{after}[n] \cdot p_i^*[n]\}$. This estimation can in general be performed better with a filter response h[n] optimized for the statistics of the time varying channel. Thus, the calculation of $w_i[n]$ may be generalized to any filtering of the sample crosscorrelation.

In particular, the generalized calculation of the weights is given by:

$$\underline{w}_i[n]\big|_{p_i[n]} = \sum_{k=-\infty}^{\infty} h[n-k]\underline{u}_{after}[k]p_i*[k];$$

where $h[\cdot]$ is the impulse response of the filter that generates the weights.

Of course, in a practical system the impulse response cannot extend to the infinite future, but with consideration for time aligning signal delays a limited non-causal filter can be emulated by delaying the information symbol estimate to line up with the causal filter output.

Turning specifically to DS-CDMA systems, the filter 30 may operate at the symbol rate, as follows:

$$\underline{w}_{(symb)}[m] = \sum_{k=-\infty}^{\infty} h_{(symb)}[m-k]z_{(symb)}[k] \text{ where}$$

$$z_{(symb)}[m] = \sum_{n=mK}^{mK+K-1} \underline{u}_{after}[n]p*[n].$$

For notational simplicity, the finger index i has been omitted. The index "m" is a time index at the symbol rate and the "symb" subscript explicitly denotes a symbol based sample rate, as opposed to the chip based sample rates used elsewhere in the document. (From Section II, there are K chips in an information symbol.) With the above notation, the initial symbol estimates become:

$$\hat{b}_{i(symb)}[m] = \sum_{n=mK}^{mK+K-1} \underline{u}_{after}[n]_{C_i} * [n]$$

and the finger output for finger i, 1 is generated at the symbol rate as:

$$f_{i,1(symb)}[m] = w_{(symb)}{}^H[m]\hat{b}_{i(symb)}[m].$$

The combination of the accumulate and dump operation and filtering at the symbol rate is effectively the same as filtering the chip-rate pilot crosscorrelation ($u_{after}[n] \cdot p_i^*[n]$) by a square filter response of length equal to the duration of a symbol, and decimating to reduce the processing sample rate to the symbol rate. The decoupling of the processing of the sample correlation matrix Θ[n] from the processing of the crosscorrelation provided by the present invention makes this particularly easy.

The approximate equality between the weights $w_i$ and $G^{-1/2}d$ indicates that the weights $w_i$ are essentially an estimate the channel response; thus, the pilot signal has been used to estimate the channel response. Although the weights are based on a cross correlation between the decorrelated vector $u_{after}$ and the desired signal, this cross correlation need not be explicitly performed if, for example, a pilot is available to replace the desired signal in the crosscorrelation.

SECTION IV

This Section will describe an alternate embodiment of the present invention where the matrix $\hat{R}[n]$ may be poorly conditioned.

In the absence of noise, the rank of the matrix R[n] described in Section III will be given by the number of signals impinging on the antenna array 10, as each such signal contributes to some new mode. If there are more such signals than there are antennae, then the problem will be overconstrained, allowing for the unique solutions discussed. If there are fewer signals than antennae, then the correlation matrix R[n] will not be invertible, and the system described above may be unstable. In practice, thermal noise will be uncorrelated from antenna to antenna and may thus assure the correlation matrix R[n] is full rank. However, while the matrix R[n] will not be singular it may still provide very poor conditioning of the matrix $\hat{R}[n]$, leaving the system unstable.

In particular, while it is true that thermal noise provides a full rank matrix, the level of that thermal noise is typically low enough as to not help provide adequate conditioning of the matrix $\hat{R}[n]$. At the same time, there is quantization noise at the Analog to Digital Converter (ADC). However, in the presence of highly correlated inputs, the ADC quantization noise may also be highly correlated, still leaving the correlation matrix $\hat{R}[n]$ ill-conditioned. Also, there is typically a strong similarity in the antenna received vectors for all of the received paths, so that even if the number of received paths is greater than the number of antennas, the high correlations can result in a poorly conditioned matrix. Because of this, channel characteristics are important in selecting the positioning of antennas.

Figure 5:
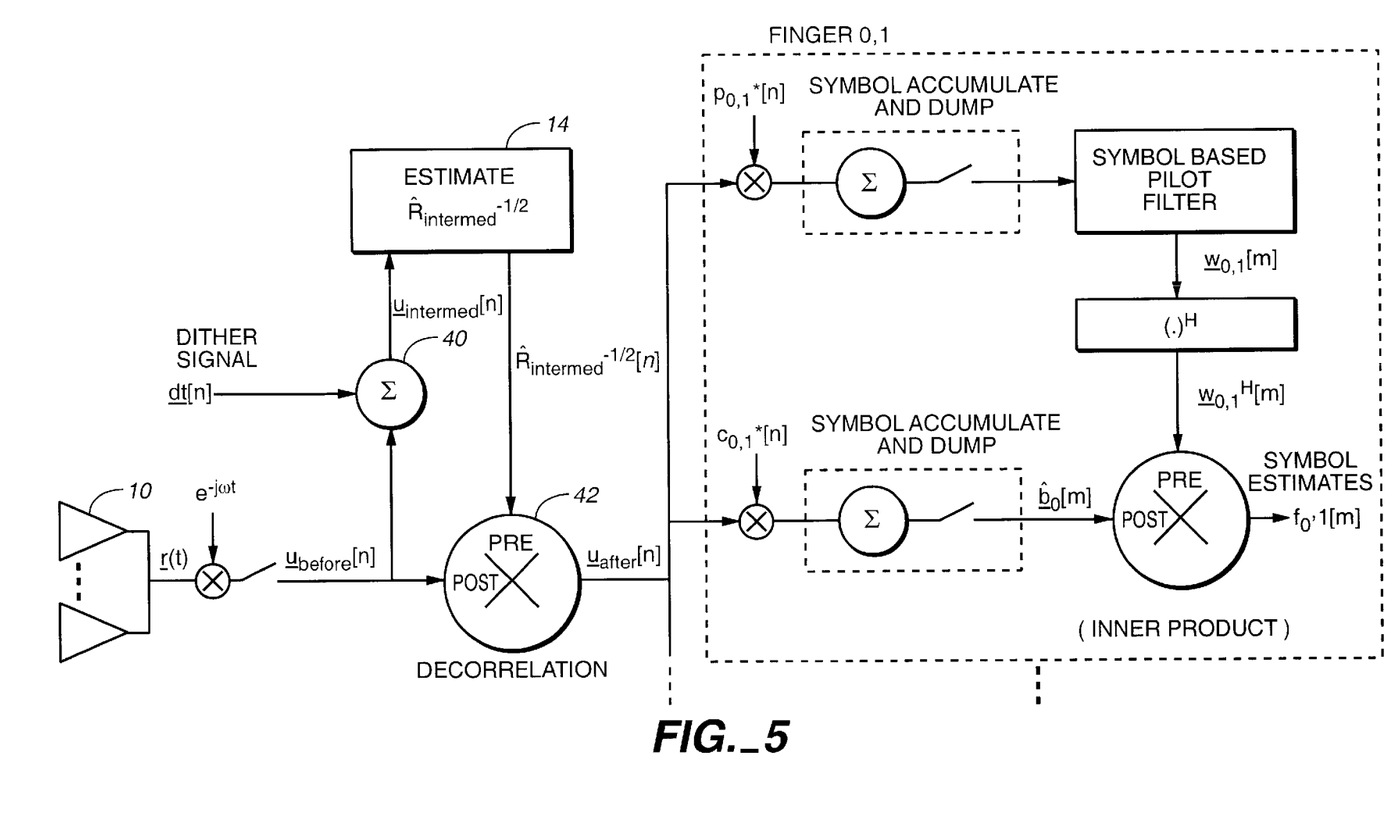
FIG. 5 is a block diagram of a DS-CDMA receiver, constructed in accordance with an embodiment of the present invention, that includes dithering to enhance stability.

FIG. 5 is a block diagram of an alternate embodiment of the present invention that may be used for systems where $\hat{R}[n]$ would otherwise be poorly conditioned. As shown, the vector $u_{before}[n]$ is provided to a summer 40, where it is added to a randomized dither signal dt[n] to create a vector $u_{intermediate}[n]$. The matrix $G^{-1/2}[n]$ is derived according to Section III based upon $u_{intermediate}[n]$ by decorrelation block 14, and the inner product of this matrix and $u_{before}[n]$ results in $u_{after}[n]$, which is produced by adder/summer 42. The signal $u_{after}[n]$ is then processed as described with reference to FIG. 2.

More specifically, the elements of d are chosen to be decorrelated with each other and of equal power $\alpha^2$, so that $$E\{dd^H\}=\alpha^2 I$$

and $$R_{after}=E\{u_{after}u_{after}{}^H\}=E\{u_{int}u_{int}{}^H\}+E\{dd^H\}=R_{int}+\alpha^2 I$$

Then $$R_{after}=Q\Lambda_{int}u_{int}Q^H+\alpha^2 Q(\Lambda_{int}+\alpha^2 I)Q^H$$

Thus, $$\min(eig(R_{after}))=\min(eig(R_{int})+\alpha^2)$$

$\alpha^2$ can be selected as the smallest number which guarantees acceptable conditioning. Usually dt will consist of a series of +-1s modulating the least significant bit. If the selected value of $\alpha^2$ is too small to be realized with the given number of bits, it can be added periodically rather than every sample, to reduce its average power.

d can be selected in many ways. For example, it may or may not be pseudo-random. If d cycles through the non-random sequence:

[100 . . . 00]
[010 . . . 00]
[000 . . . 10]
[000 . . . 01]

The result (considering averaging over a "random" start time) will be $$E\{dd^H\}=(1/N)I$$

(As used above, the condition of a matrix means the commonly accepted definition:

$$cond(R)=\max(eig(R))/\min(eig(R))$$

where eig(R) gives the N eigen values of R, as defined by the relation $$R=Q\Lambda Q^H$$

where $\Lambda=diag(\lambda_0, \lambda_1 \ldots \lambda_{N-1})$ is the eigen value matrix $\lambda_i$ is the ith eigen value (these are usually ordered from the largest to the smallest)

Q is a unitary matrix such that $QQ^H=Q^HQ=I$, comprised of the eigen vectors
Thus $$cond(R)=\lambda_0/\lambda_{N-1}$$

In the case of a matrix with rank $\rho<N$, we have $$\lambda_i=0; i\geq\rho$$

in which case the condition number goes to infinity. In general the larger the condition number the worse the conditioning of the matrix and the harder it is to correctly invert the matrix.)

SECTION V

The specific embodiment of the present invention described in Section I is based upon two step Wiener filtering, according to the present invention. This Section describes the present invention's use of two step Wiener filtering more generally and then describes an alternate embodiment based on that filtering.

According to Wiener filtering, to minimize the mean square error between a desired (e.g. transmitted) signal d[n] and the estimate of that symbol y[n] where a receiver receives a plurality of signals u[n] (each element of the vector corresponding to one of the signals), the estimate y[n] should equal $w^H[n]u[n]$, where $w[n]=R^{-1}[n]p[n]$. In the above equations, R[n] is the correlation matrix that represents the correlation of the received signals u[n], and p[n] is the crosscorrelation between a desired signal and the received signal. According to the present invention, an estimate $\hat{R}^{-1}[n]$ of the matrix $R^{-1}[n]$ need only be calculated once (for a time n). The estimate $\hat{R}^{-1}[n]$ may then be employed to generate a plurality of symbol estimates for a corresponding plurality of signal paths. In particular, the weights for a particular symbol path i may be taken as $\hat{R}^{-1}[n]p_i[n]$, where $p_i[n]$ is the cross correlation between a desired signal for path i and the input signal u[n]. The symbol estimate for path i is then generated by multiplying these weights by the input signal u[n].

Figure 6:
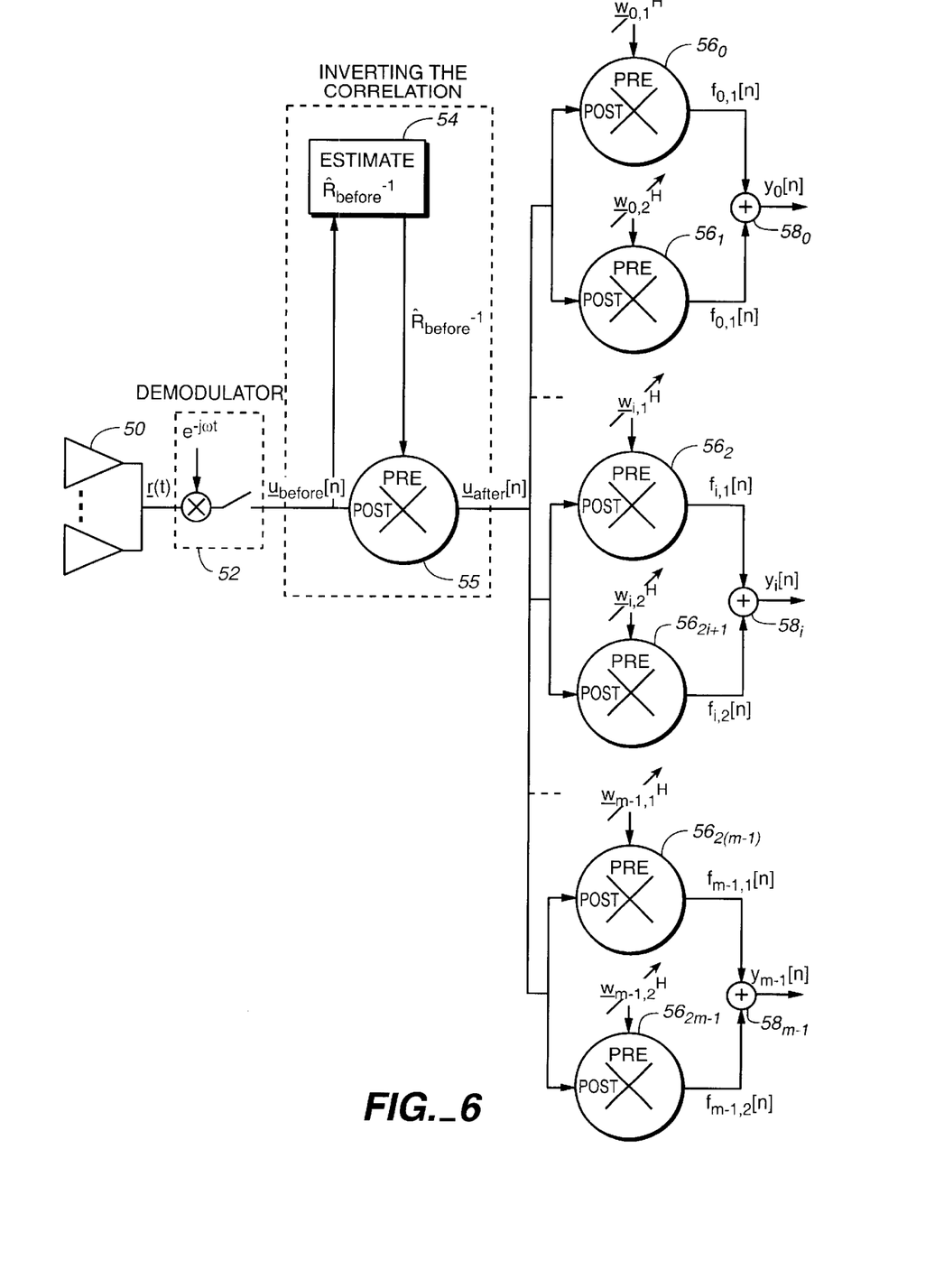
FIG. 6 is a block diagram of a receiver that implements two step Wiener filtering according to the present invention.

The above described technique may be implemented in many ways, as illustrated in FIG. 1 and in an alternate embodiment shown in FIG. 6. As shown, a plurality of p reception elements, shown as a plurality of antennae 50, receive through a communications channel an input signal that comprises a plurality of received signals $\{r_0(t), r_1(t) \ldots r_{p-1}(t)\}$ respectively and provide them to a demodulator 52, which outputs a digital signal time indexed by the letter n. In other types of technologies, the reception elements may comprise, for example, different fiber optic channels or the like or taps of a delay line.

The output of the demodulator 52 is represented as a vector $u_{before}$, with elements that equal the complex baseband of the signals $\{r_0(t), r_1(t) \ldots r_{p-1}(t)\}$ after they have been demodulated and sampled. A possible composition of vector $u_{before}[n]$ is more thoroughly described in Section II.

Vector $u_{before}[n]$ is provided to a calculation block 54, which generates a matrix that is based on the correlation of the input signal $u_{before}[n]$. In particular, calculation block 54 derives an estimate $\hat{R}^{-1}[n]$ that is based on the correlation of the input signal $u_{before}[n]$ of the inverse of the correlation matrix $\hat{R}[n]$. The estimate $\hat{R}^{-1}[n]$ and $u_{before}[n]$ are provided to a multiplier 55 which generates the modified input signal $u[n]=\hat{R}^{-1}[n]u_{before}[n]$. This modified input signal $u_{after}[n]$ is provided to a plurality of multiplier/summers 56, which derive a symbol estimate for a signal path i by multiplying $u_{after}[n]0$ by a plurality of weights $$w_i[n] = \hat{p}[n] = \sum_{k=-\infty}^{n} \lambda^{n-k}[k]u_{before}d_i*[k]$$

that are specific to the signal path, where $d_i*[k]$ is the desired signal for that signal path. In the case where the signal paths are fingers for a user, the finger symbol estimates are added together by one of a plurality of adders 58 to generate the symbol estimate for that user.

As will be appreciated, according to the architecture illustrated in FIG. 6, the entire Wiener filtering process need not be separately performed for each signal path.

Instead, $\hat{R}^{-1}[n]$ may be generated once (for a particular time n) and the result applied to each signal path.

The architecture illustrated in FIG. 6 may be implemented with RLS filtering, in which case $\hat{R}^{-1}[n]$ may be generated as follows:
Letting $$\underline{k}[n] = \frac{\lambda^{-1}\Theta^{-1}[n-1]\underline{u}[n]}{1+\lambda^{-1}\underline{u}^H[n]\Theta^{-1}[n-1]\underline{u}[n]}, \quad \text{then}$$

$$\Theta^{-1}[n] = \lambda^{-1}\Theta^{-1}[n-1] - \lambda^{-1}\underline{k}[n]\underline{u}^H[n]\Theta^{-1}[n-1]; \quad \text{where}$$

$\hat{R}[n]=(1-\lambda)\Theta[n]$ and $\lambda$ is an exponential forgetting factor. The weights $w_i[n]$ for signal path i may be generated as follows:

$$w_i[n]=w_i[n-1]+\underline{k}[n](d_i^*[n;\ ]-\underline{u}^H[n]w_i[n-1]).$$

For a DS-CDMA system with a pilot signal, the pilot signal for signal path i may be used as the desired signal.

There are alternate implementations of the architecture illustrated in FIG. 6.

CONCLUSION

Numerous variations and modifications will become apparent to those skilled in the art once the above disclosure is fully appreciated. It is intended that the following claims be interpreted to embrace all such variations and modifications.

What is claimed is:

1. A method for recovering from a signal estimates of information symbols for at least two receive paths, the signal being transmitted through a channel with a response, the method comprising the steps of:
    (A) receiving an input signal;
    (B) at least partially decorrelating the input signal to derive a decorrelated version of the input signal;
    (C) deriving a plurality of weights based upon a cross correlation between the decorrelated version and a desired signal that contains an information symbol for the first receive path;
    (D) processing a version of the decorrelated version with information that is specific to a first receive path including multiplying the decorrelated version by the weights to recover an estimate of the information symbol for the first receive path; and
    (E) processing a version of the decorrelated version with information that is specific to a second receive path to recover an estimate of an information symbol for the second receive path.

2. The method of claim 1, wherein the first and the second receive paths are receive paths for two distinct users.

3. The method of claim 1, wherein the first and the second receive paths are receive paths for two distinct fingers for th e same user.

4. The method of claim 1, wherein the weights are specific to the first receive path.

5. The method of claim 1, wherein the step of deriving the plurality of weights comprises the sub-step of estimating the channel response.

6. The method of claim 5, wherein (i) the input signal includes a pilot signal and (ii) the step of estimating the channel response comprises the sub-step of filtering a version of the pilot signal.

7. The method of claim 5, wherein the step of estimating the channel response comprises the sub-step of employing decision directed feedback.

8. The method of claim 1, wherein the input signal is transmitted in accordance with a code division multiple access technique.

9. The method of claim 6, further comprising the step of accumulating an estimate of the pilot signal from the decorrelated version, wherein the step of filtering comprises the sub-step of filtering the estimate of the pilot signal.

10. The method of claim 1, further including the steps of:
    demodulating the input signal; and
    sampling the input signal, wherein the decorrelated version comprises a digital signal.

11. A method for recovering from a signal estimates of information symbols for at least two receive paths, the signal being transmitted through a channel, the method comprising the steps of:
    (A) receiving an input signal represented as a vector before with a plurality of elements each equal to a complex baseband of a portion of the input signal;
    (B) generating a decorrelation matrix $G^{-\frac{1}{2}}$ that is a Cholesky decomposition of an estimate of a correlation matrix of the input signal;
    (C) multiplying the vector $u_{before}$ by the decorrelation matrix $G^{-\frac{1}{2}}$ to derive a decorrelated version of the input signal;
    (D) processing a version of the decorrelated version with information that is specific to a first receive path to recover an estimate of an information symbol for the first receive path; and
    (E) processing a version of the decorrelated version with information that is specific to a second receive path to recover an estimate of an information symbol for the second receive path.

12. The method of claim 3, further comprising the step of adding together the symbol estimates for the first and the second receive paths to derive an estimate of an information symbol for the user.

13. The method of claim 11, wherein the input signal comprises a plurality of received signals received over a corresponding plurality of antennae.

14. The method of claim 11, wherein the step of generating the decorrelation matrix $G^{-\frac{1}{2}}$ comprises the sub-steps of:
    defining a matrix M with an upper right hand vector; and
    annihilating the upper right hand vector of the matrix M.

15. The method of claim 14, wherein the step of annihilating comprises the sub-step of performing a Givens rotation.

16. The method of claim 1, wherein the step of at least partially decorrelating the input signal comprises the sub-step of completely decorrelating the input signal.

17. A method for recovering an estimate of an information symbol transmitted as part of an input signal, the method comprising the steps of:
    (A) receiving the input signal comprising a plurality of received signals;
    (B) at least partially decorrelating the received signals to create a plurality of decorrelated signals;
    (C) generating a plurality of weights including multiplying a version of at least one of the decorrelated signals by a desired signal that contains the information symbol;
    (D) multiplying a version of each of the received signals by a corresponding one of the weights to create a plurality of weighted estimates; and
    (E) adding together the weighted estimates to derive an estimate of the information symbol.

18. The method of claim 17, wherein the step of at least partially decorrelating the received signal comprises the sub-step of completely decorrelating the received signal.

19. The method of claim 17, wherein the step of generating the plurality of weights comprises the sub-step of generating a cross correlation of at least one of the received signals with the desired signal.

20. The method of claim 19, wherein the step of generating a cross correlation comprises the sub-step of filtering.

21. The method of claim 19, wherein the step of generating a cross correlation comprises the sub-step of applying a weighting factor to at least one of the received signals and the desired signal, wherein the weighting factor decays exponentially with time.

22. The method of claim 19, wherein the step of generating the plurality of weights comprises the sub-step of generating a cross correlation of each of the received signals with the desired signal.

23. The method of claim 19, wherein the step of at least partially decorrelating the received signals comprises the sub-step of generating a matrix $G^{-\frac{1}{2}}$ that is a Cholesky decomposition of an estimate of a correlation matrix R defined by a recursive least squares methodology.

24. The method of claim 23, further comprising the step of dithering the received signals.

25. method of claim 17, wherein the desired signal is a pilot signal.

26. The method of claim 17, further comprising the step of demodulating the input signal to create a demodulated signal, wherein the step of deriving the plurality of weights comprises the sub-step of using the demodulated signal as the desired signal.

27. The method of claim 17, wherein the input signal comprises a plurality of signals received over a corresponding plurality of antenna.

28. The method of claim 17, wherein the input signal is transmitted according to a code division multiple access technique.

29. A method for recovering an estimate of a particular information symbol from an input signal that includes other information symbols that interfere with the particular information symbol, the method comprising the steps of:
(A) receiving the input signal;
(B) deriving a decorrelation matrix for a time interval n based upon a past decorrelation matrix for a time interval prior to n;
(C) applying the decorrelation matrix for the time interval n to a version of the input signal to create a plurality of signals uncorrelated from one another;
(D) deriving a plurality of weights;
(E) multiplying a version of each of the decorrelated signals by a corresponding one of the weights to create a plurality of estimates; and
(F) adding together the plurality of estimates to obtain an estimate of the information symbol.

30. The method of claim 29, wherein the decorrelation matrix is a Cholesky decomposition of a matrix R which is a correlation matrix defined by a recursive least squares methodology.

31. The method of claim 29, wherein the other information symbols that interfere with the particular information symbol comprise different users' information symbols.

32. The method of claim 29, wherein the input signal comprises a plurality of received signals received over a corresponding plurality of antennae.

33. The method of claim 29, wherein the weights are based on a cross correlation between a decorrelated version of the input signal and a desired signal that contains the information symbol.

34. A method for recovering an estimate of an information symbol transmitted as part of an input signal, the method comprising the steps of:
(A) receiving a plurality of received signals over a corresponding plurality of antennae, each of the received signals being encoded such that one information symbol corresponds to a plurality of transmitted symbols;
(B) decoding a version of each of the received signals to create a corresponding plurality of initial symbol estimates;
(C) generating a plurality of weights from the received signals based upon a cross correlation between a decorrelated version of the received signals and a desired signal that contains the information symbol;
(D) multiplying each of the initial symbol estimates by a corresponding one of the weights to create a plurality of weighted estimates; and
(E) adding together the weighted estimates.

35. The method of claim 34, wherein (i) the input signal is transmitted according to a code division multiple access technique and (ii) the step of decoding a version of each of the received signals comprises the sub-step of despreading a version of each of the received signals.

36. The method of claim 34, further comprising the step of decorrelating the input signals to generate a plurality of decorrelated signals, wherein the version of each of the received signals is one of the decorrelated signals.

37. The method of claim 36, wherein the step of decorrelating the input signals comprises a square root Kalman filtering methodology.

38. A method for recovering an estimate of an information symbol by a receiver in a code division multiple access system where the information symbol is spread at a chip rate and is included within a signal that propagates through a channel with a time varying response, the method comprising the steps of:
(A) receiving a pilot signal;
(B) receiving a plurality of received signals each over a corresponding one of a plurality of reception elements;
(C) generating a plurality of weights from the pilot signal based upon a cross correlation between decorrelated versions of the received signals and a desired signal that contains the information symbol;
(D) multiplying a version of each of the received signals by a corresponding one of the weights to create a plurality of weighted estimates; and
(E) adding together versions of the weighted estimates to derive an estimate of the information symbol.

39. The method of claim 38, further comprising the step of decorrelating the received signals.

40. The method of claim 38, wherein the step of generating a plurality of weights comprises the sub-step of filtering the pilot signal.

41. A method for recovering from a signal estimates of information symbols for at least two receive paths, the signal being transmitted through a channel with a response, the method comprising the steps of:
(A) receiving an input signal;
(B) performing a recursive calculation to derive a matrix based on a correlation of the input signal; and
(C) generating symbol estimates in response to the matrix for a plurality of signal paths.

42. The method of claim 41, wherein the matrix is a correlation matrix as defined by a recursive least squares methodology.

43. The method of claim 41, further comprising the steps of:

generating a plurality of weights;

multiplying each of the weights by a corresponding one of a plurality of signals to derive a plurality of weighted estimates; and adding together the weighted estimates to generate a symbol estimate.

44. The method of claim 41, wherein the step of generating symbol estimates comprises the sub-step of multiplying the input signal by the matrix to derive a modified input signal.

45. The method of claim 44, further comprising the steps of:

generating a cross correlation between the input signal and a desired signal to derive a plurality of weights;

multiplying the modified input signal by the weights to generate a plurality of weighted estimates; and adding together the weighted estimates to generate a symbol estimate.

* * * * *